United States Patent [19]
Shimada

[11] Patent Number: 5,912,629
[45] Date of Patent: Jun. 15, 1999

[54] SUBSCRIBER INTERFACE CONTROL METHOD

[75] Inventor: Hideaki Shimada, Tokyo, Japan

[73] Assignee: NEC Corporation, Japan

[21] Appl. No.: 08/592,664

[22] Filed: Jan. 26, 1996

[30] Foreign Application Priority Data

Jan. 27, 1995 [JP] Japan ................................. 7-011404

[51] Int. Cl.⁶ .................................................. H04M 3/00
[52] U.S. Cl. .................... 340/825.06; 370/436; 370/442; 370/485; 370/487; 348/6; 348/10; 348/11; 348/12; 455/6.2; 455/6.3; 340/825.07
[58] Field of Search ................. 340/825.06, 825.07; 348/11, 10, 6, 12; 455/6.2, 6.3; 370/436, 442, 485, 487, 332

[56] References Cited

U.S. PATENT DOCUMENTS

| | | | |
|---|---|---|---|
| 4,327,436 | 4/1982 | Ohara et al. | 370/110.1 |
| 4,947,162 | 8/1990 | Kimura | 340/825.08 |
| 5,420,578 | 5/1995 | O'Brien et al. | 340/870.13 |
| 5,675,638 | 10/1997 | Ogasawara et al. | 379/220 |
| 5,719,867 | 2/1998 | Borazjani | 370/436 |

Primary Examiner—William A. Cuchlinski, Jr.
Assistant Examiner—Yonel Beaulieu
Attorney, Agent, or Firm—Ostrolenk, Faber, Gerb & Soffen, LLP

[57] ABSTRACT

In a subscriber interface control method, a plurality of subscriber interface sections set with different unique accommodation location numbers corresponding to accommodation locations thereof and a subscriber interface control section connected to the subscriber interface sections via a control/monitor signal line to control the subscriber interface sections and monitor operation states thereof. Management number sections in which different management numbers are set are arranged in the subscriber interface sections. The subscriber interface control section controls the subscriber interface sections and monitors the operation states thereof by sending the management numbers to the control/monitor signal line.

4 Claims, 2 Drawing Sheets

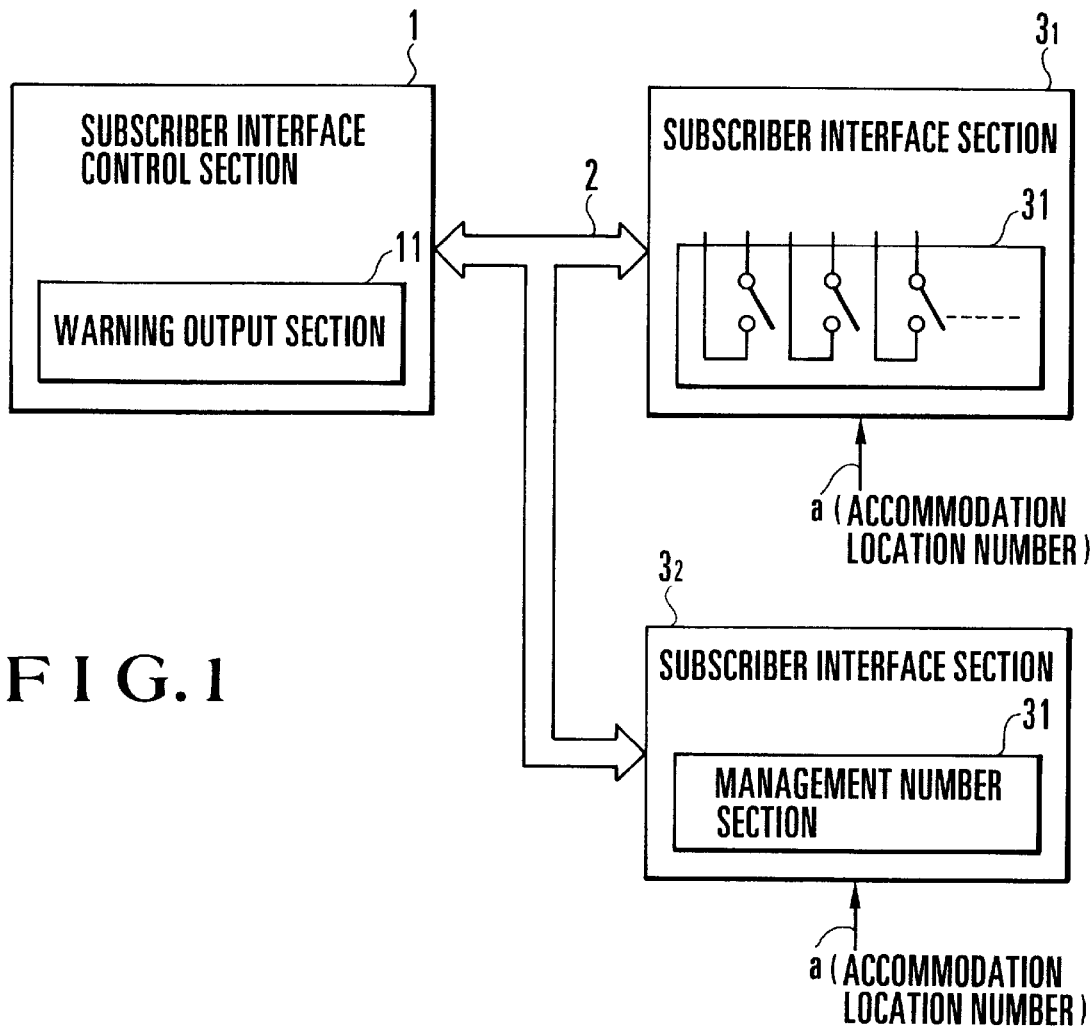

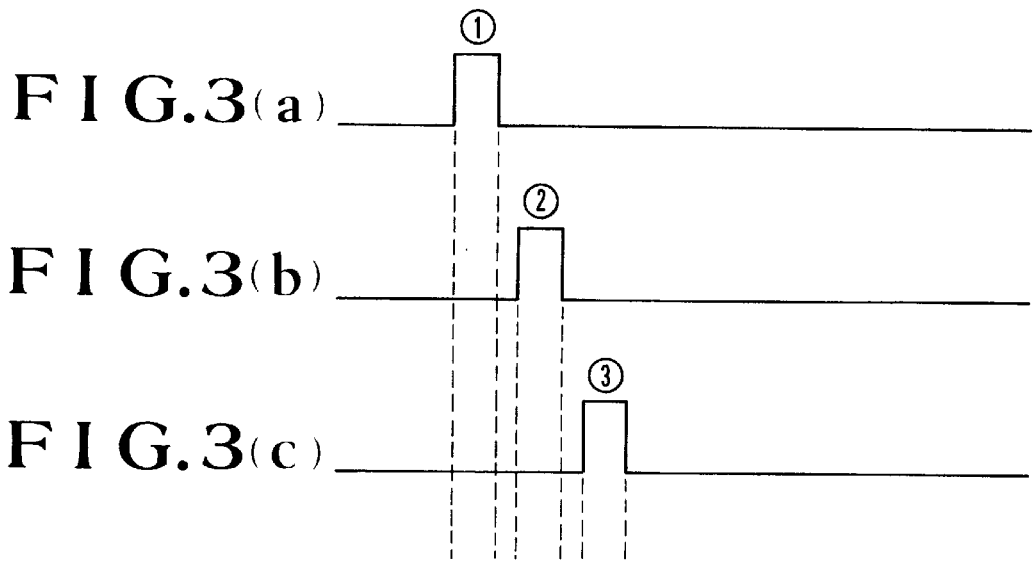
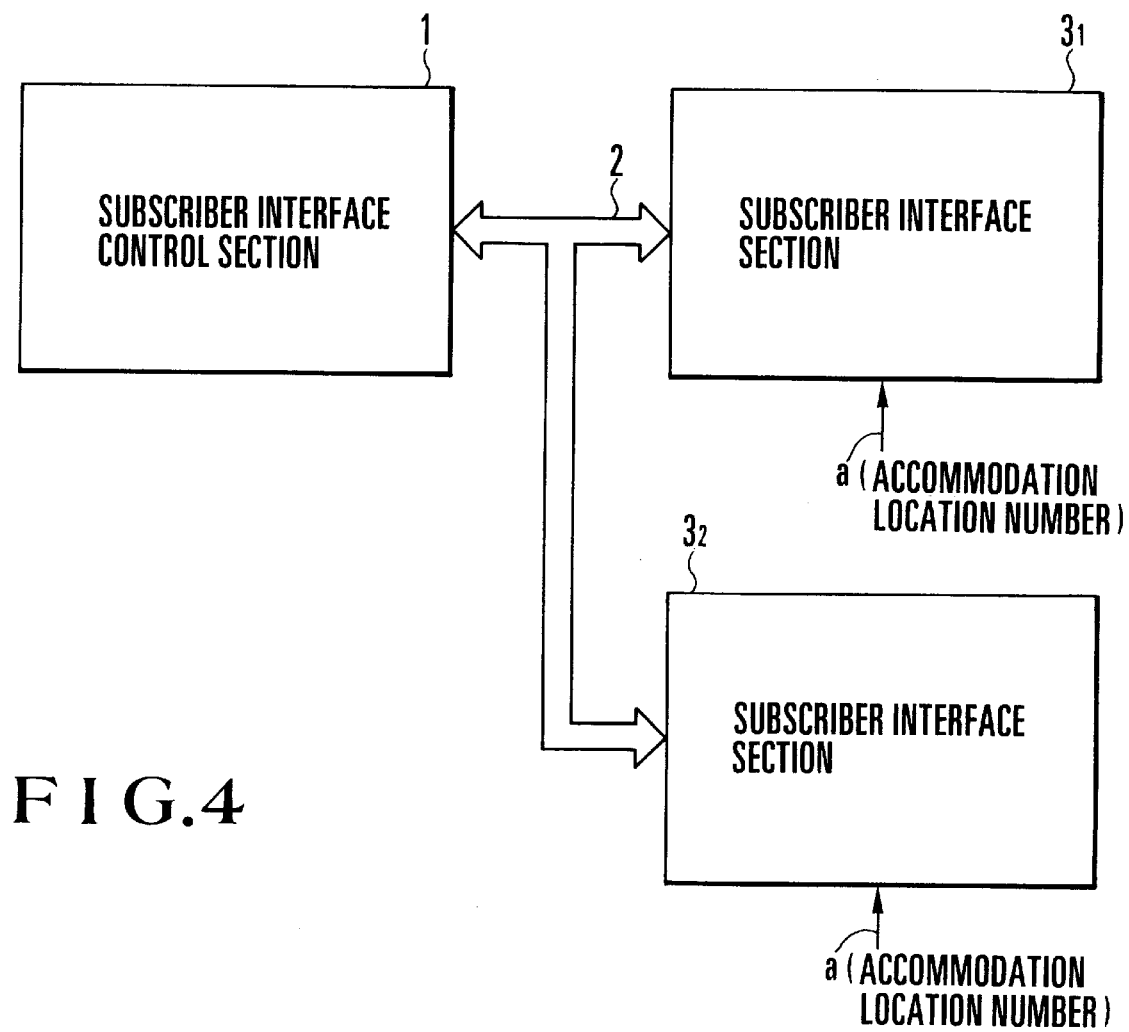

SUBSCRIBER INTERFACE CONTROL METHOD

BACKGROUND OF THE INVENTION

The present invention relates to a subscriber interface control method of controlling a plurality of subscriber interface sections and monitoring their operation states.

A communication system having an interface with subscribers generally includes a plurality of subscriber interface sections such as a plurality of line circuits. One subscriber interface control section controls the operations of these subscriber interface sections and monitors their operation states. In such a case, with an increase in the number of subscriber interface sections, the number of control signal lines from the control section to the subscriber interface sections increases. For this reason, the control section is connected to the respective subscriber interface sections via one control signal line. The control section controls the subscriber interface sections and monitors their operation states via this control signal line.

FIG. 4 shows a conventional arrangement of such a communication system. Referring to FIG. 4, reference numeral 1 denotes a subscriber interface control section; 2, a control/monitor signal line made of one line; and $3_1$ and $3_2$, subscriber interface sections.

When the accommodation locations of the subscriber interface sections $3_1$ and $3_2$ are determined, accommodation location numbers $\underline{a}$ unique to the respective subscriber interface sections and corresponding to the accommodation locations are automatically set. The subscriber interface control section 1 controls the subscriber interface sections $3_1$ and $3_2$ in accordance with these set accommodation location numbers $\underline{a}$.

The subscriber interface control section 1 sends the accommodation location number a corresponding to the subscriber interface section to be controlled and control instruction data to the control/monitor signal line 2. These accommodation location numbers a are different numbers unique to the respective subscriber interface sections. Of the subscriber interface sections, only the subscriber interface section corresponding to this accommodation location number $\underline{a}$ receives the control instruction data following the accommodation location number $\underline{a}$. As a result, the corresponding subscriber interface section is set in the operation state based on this instruction.

Assume that a control instruction is sent from the subscriber interface control section 1 to the interface section $3_1$ whose accommodation location number $\underline{a}$ is "1". In this case, only the interface section $3_1$ whose accommodation location number $\underline{a}$ is "1" is subjected to operation state control, but the interface section $3_2$ whose accommodation location number a is "2" is not subjected to control. The interface section $3_1$ having undergone control is set in the operation state based on this control, and returns information about the control result to the subscriber interface control section 1 via the control/monitor signal line 2. As a result, the subscriber interface control section 1 can recognize whether normal control is performed on the interface section $3_1$ side. Note that the subscriber interface control section 1 performs a warning output operation or the like upon determining, on the basis of the above return information, that abnormal control is performed on the interface section $3_1$ side.

The same applies to a case wherein the subscriber interface control section 1 monitors the operation state of a subscriber interface section 3. More specifically, the subscriber interface control section 1 sends the accommodation location number $\underline{a}$ corresponding to the subscriber interface section to be monitored and a monitor instruction to the control/monitor signal line 2. In this case, only the subscriber interface section whose accommodation location number coincides with the received accommodation location number returns operation state information based on the received monitor instruction to the subscriber interface control section 1 via the control/monitor signal line 2. The subscriber interface control section 1 can therefore recognize the operation state of the corresponding subscriber interface section on the basis of the return information.

Assume that a monitor instruction is sent from the subscriber interface control section 1 to the interface section $3_1$ whose accommodation location number $\underline{a}$ is "1". In this case, only the interface section $3_1$ whose accommodation location number $\underline{a}$ is "1" receives the monitor instruction, but the interface section $3_2$ whose accommodation location number $\underline{a}$ is "2" receives no monitor instruction. The interface section $3_1$, which has received the monitor instruction, returns information about the operation state to the subscriber interface control section 1. The subscriber interface control section 1 performs a warning output operation or the like upon determining, on the basis of this return information, that the operation state of the interface section $3_1$ is abnormal.

As described above, the subscriber interface control section controls the subscriber interface sections and monitors their operation states in accordance with the accommodation location numbers unique to the subscriber interface sections. If the accommodation location of a given subscriber interface section changes for some reason, the accommodation location number of the subscriber interface section is automatically changed. The subscriber interface control section cannot therefore control this subscriber interface section by using the old number. For this reason, every time the accommodation location of a given subscriber interface section changes, the subscriber interface control section must change the control/monitor designation number for controlling and monitoring the given subscriber interface section. In addition, the subscriber interface control section must perform control and monitor operations for the subscriber interface section again and recognize the operation result. The change/setting of a control/monitor designation number, confirmation of an operation state by the system after the changing/setting operation, and the like are cumbersome operations.

SUMMARY OF THE INVENTION

It is, therefore, an object of the present invention to allow a subscriber interface control section to control each subscriber interface section and monitor its operation state without changing a control/monitor designation number for controlling and monitoring each subscriber interface section even if the accommodation location number of each subscriber interface section changes upon a change in the accommodation location of the section.

In order to achieve the above object, according to the present invention, there is provided a subscriber interface control method, comprising arranging a plurality of subscriber interface sections set with different unique accommodation location numbers corresponding to accommodation locations thereof and a subscriber interface control section connected to the subscriber interface sections via a control/monitor signal line to control the subscriber interface sections and monitor operation states thereof, arranging, in the subscriber interface sections, management number sections in which different management numbers are set, and causing the subscriber interface control section to control the subscriber interface sections and monitor the operation states thereof by sending the management numbers to the control/monitor signal line.

BRIEF DESCRIPTION OF THE DRAWINGS

FIG. 1 is a block diagram showing an embodiment of the present invention;

FIGS. 2A to 2C are views showing transmission formats in a system according to the embodiment in FIG. 1;

FIGS. 3A to 3C are timing charts showing the transmission timing of accommodation location information in the system of the embodiment; and FIG. 4 is a block diagram showing a conventional system.

DESCRIPTION OF THE PREFERRED EMBODIMENT

The present invention will be described below with reference to the accompanying drawings.

FIG. 1 shows an embodiment of a system to which a subscriber interface control scheme according to the present invention is applied.

Referring to FIG. 1, similar to the conventional system in FIG. 4, the system of this embodiment comprises a subscriber interface control section 1, a control/monitor signal line 2 made of a line, and subscriber interface sections $3_1$ and $3_2$.

Accommodation location numbers a corresponding to the accommodation locations of the subscriber interface section $3_1$ and $3_2$ are automatically set therein.

According to the conventional scheme, the subscriber interface control section 1 controls the operations of the subscriber interface sections $3_1$ and $3_2$ and monitors their operation states on the basis of the accommodation location numbers a of the subscriber interface sections $3_1$ and $3_2$. In this arrangement, however, if the accommodation locations of the subscriber interface sections $3_1$ and $3_2$ are changed, the subscriber interface control section 1 must change control/monitor designation numbers for controlling the subscriber interface sections $3_1$ and $3_2$ and monitoring their states.

In this embodiment, therefore, the subscriber interface sections $3_1$ and $3_1$ include management number sections 31, in which different management numbers b are set, and the subscriber interface control section 1 can control the operations of the subscriber interface sections $3_1$ and $3_2$ and monitor their states on the basis of the management numbers b.

The operation of the system of this embodiment will be described in detail next with reference to FIGS. 1 to 3C.

The management numbers b unique to the subscriber interface sections $3_1$ and $3_2$ in FIG. 1 are set in the respective management number sections 31. More specifically, the management numbers b are set by using switch setting means on the subscriber interface sections $3_1$ and $3_2$. As switch setting means, a plurality of manual switches are used. For example, DIP switches are used. When the subscriber interface sections $3_1$ and $3_2$, in which the management numbers are set, are accommodated at accommodation locations, unique accommodation location numbers a corresponding to the accommodation locations are automatically set in the subscriber interface sections $3_1$ and $3_2$.

In this case, the subscriber interface control section 1 controls the subscriber interface sections $3_1$ and $3_2$ and monitors their operation states in accordance the management numbers respectively set in the subscriber interface sections $3_1$ and $3_2$.

When the subscriber interface control section 1 is to control a subscriber interface section, the section 1 sends the management number b corresponding to the subscriber interface section to be controlled and control instruction data c to the control/monitor signal line 2. The management numbers b are different numbers unique to the respective subscriber interface sections. Of the subscriber interface section, therefore, only the subscriber interface section corresponding to this management number b receives the control instruction data c following the management number b. As a result, the corresponding subscriber interface section is set in the operation state based on the control instruction data c.

Assume that the subscriber interface control section 1 sends the control instruction data c to the interface section $3_1$ whose management number b is "1". In this case, only the interface section $3_1$ whose management number b is "1" is subjected to operation state control, but the interface section $3_2$ whose management number b is "2" is not subjected to such control. In this case, the interface section $3_1$ having undergone control is set in the operation state based on this control, and transmits return information d like the one shown in FIG. 2C as the control result to the subscriber interface control section 1 following accommodation location information e (to be described later). If the return information d indicates a normal state, the subscriber interface control section 1 can recognize that normal control has been performed on the interface section $3_1$ side. Note that the subscriber interface control section 1 outputs a warning upon determining, on the basis of the above return information d, that abnormal control has been performed on the interface section $3_1$ side.

Identical management numbers may be erroneously set in the subscriber interface sections $3_1$ and $3_2$. In such a case, the subscriber interface sections $3_1$ and $3_2$ are subjected to the same control, and output the return information d to the control/monitor signal line 2 at once. Consequently, these pieces of return information d overlap on the control/monitor signal line 2 in terms of time, and the subscriber interface control section 1 cannot properly recognize the return information d. For this reason, as shown in FIG. 2C, the pieces of return information d are transmitted from the subscriber interface sections $3_1$ and $3_2$ with the pieces of accommodation location information e being added.

These pieces of accommodation location information e are determined from the above accommodation location numbers a. If, for example, the accommodation location number a is "1", it is determined that one bit is output onto the control/monitor signal line 2 at the timing of a time position ①, as shown in FIG. 3A. If the accommodation location number a is "2", it is determined that one bit is output at the timing of a time position ②, as shown in FIG. 3B. If the accommodation location number a is "3", it is determined that one bit is output at the timing of a time position ③, as shown in FIG. 3C. Note that since the accommodation location numbers a are different from each other, these bits are not outputted at the same time.

Assume that the subscriber interface control section 1 transmits the management number b to control the corresponding subscriber interface section, and receives 1-bit accommodation location information e therefrom. In this case, therefore, the subscriber interface control section 1 recognizes that different management numbers are respectively set in the subscriber interface sections $3_1$ and $3_2$. If the subscriber interface control section 1 receives a plurality of pieces of accommodation location information e, the section 1 recognizes that identical management numbers are set in a plurality of subscriber interface sections. If identical management numbers b are set as in this case, the subscriber interface control section 1 immediately stops the control operation and causes the warning output section 11 to output a warning indicating this state, thereby instructing the operator to properly set the management number b.

An operation to be performed in monitoring the state of a subscriber interface section 3 will be described next. The subscriber interface control section 1 sends the management number b corresponding to the subscriber interface section to be monitored and a monitor instruction f to the signal line 2 (FIG. 2B). In this case, only the subscriber interface section whose management number coincides with the received management number b transmits information about its operation state based on the received monitor instruction, as the return information d, to the subscriber interface control section 1 via the signal line 2 (FIG. 2C). The subscriber interface control section 1 can therefore recognize the operation state of the corresponding subscriber interface section on the basis of the return information d.

If, for example, the monitor instruction f is sent from the subscriber interface control section 1 to the interface section $3_1$ whose management number b is "1", only the interface section $3_1$ whose management number b is "1" receives the monitor instruction f, but the interface section $3_2$ whose management number b is "2" receives no monitor instruction. The interface section $3_1$, which has received the monitor instruction f, then returns information about its operation state to the subscriber interface control section 1. If the subscriber interface control section 1 determines, on the basis of the return information d, that the operation state of the interface section $3_1$ is abnormal, the section 1 causes the warning output section 11 to output a warning indicating this abnormal state.

Similar to the case of the control instruction data c, the subscriber interface section, which has received the monitor instruction f, adds one-bit accommodation location information e to the return information d, and transmits the resultant information to the subscriber interface control section 1. In this case, similar to the above case, upon detection of the accommodation location information e of a plurality of bits from the subscriber interface section side, the subscriber interface control section 1 determines that identical management numbers are set in a plurality of subscriber interface sections, and causes the warning output section 11 to output a warning indicating this state, thereby instructing the operator to properly set the management number b.

As described above, the management numbers b unique to the subscriber interface sections $3_1$ and $3_2$ are set therein, and the subscriber interface control section 1 controls the subscriber interface sections $3_1$ and $3_2$ and monitors their operation states on the basis of these management numbers b. Even if, therefore, the accommodation locations of the subscriber interface sections $3_1$ and $3_2$ are changed, the subscriber interface control section 1 need not change the control/monitor designation numbers for controlling and monitoring these sections. Consequently, the change of a control/monitor designation number, confirmation of the operation state of the system after the changing operation, and the like need not be performed.

If identical management numbers are erroneously set in the subscriber interface sections $3_1$ and $3_2$, the subscriber interface control section 1 recognizes this error, and outputs a warning. The operator can therefore set a management number reliably.

In this embodiment, the system includes two subscriber interface sections. However, the same effects as described above can be obtained even if the system includes three or more subscriber interface sections.

As has been described above, according to the present invention, different management numbers are set in the respective subscriber interface sections. The subscriber interface sections are controlled, and their operation states are monitored on the basis of these management numbers. Even if, therefore, the accommodation location of a given subscriber interface section is changed, the subscriber interface control section need not perform a changing operation corresponding to this change. Consequently, the system need not perform cumbersome operations, e.g., changing a control/monitor designation number corresponding to a given subscriber interface section after its accommodation location is changed, and confirming an operation state based on this change.

In addition, if a management number sent from the subscriber interface control section coincides with a management number set in the management number section of a given subscriber interface section, the subscriber interface section transmits accommodation location information based on the accommodation location number to the subscriber interface control section. The subscriber interface control section detects the set state of the management number in the subscriber interface section on the basis of this accommodation location information. Therefore, the subscriber interface control section can reliably detect setting of identical management numbers.

Upon detecting that identical management numbers in subscriber interface sections, the subscriber interface control section outputs a warning. The subscriber interface control section can notify that identical management numbers are set, and hence can cause the subscriber interface sections to reliably set management numbers.

What is claimed is:

1. A subscriber interface control method, comprising: providing a plurality of subscriber interface sections, each having a unique accommodation location number corresponding to an accommodation location thereof, and a subscriber interface control section connected to said subscriber interface sections via a control/monitor signal line to control said subscriber interface sections and monitor operation states thereof; providing, in said subscriber interface section, a management number section in which a unique management number is set for each subscriber interface section; causing said subscriber interface control section to control said subscriber interface section and monitor the operation states thereof by sending the management numbers to the subscriber interface sections via the control/monitor signal line; and causing said subscriber interface sections to transmit pieces of accommodations location information with different time positions to said subscriber interface control section, via the control/monitor signal line, in units of accommodation location numbers when management numbers sent from said subscriber interface control section coincide with the management numbers set in said management number sections.

2. The method according to claim 1, further comprising interface control section to detect set states of the management numbers in said subscriber interface sections on the basis of the pieces of accommodation location information.

3. The method according to claim 2, further comprising causing said subscriber interface control section to output a warning when detecting identical management numbers in detecting the set states of the management numbers in said subscriber interface sections.

4. The method according to claim 1, wherein said management number section is constituted by a plurality of manual switches.

* * * * *